Jan. 17, 1967   J. CHAPSKY ETAL   3,299,423
DIGITAL ENCODER
Filed March 9, 1964   4 Sheets-Sheet 2

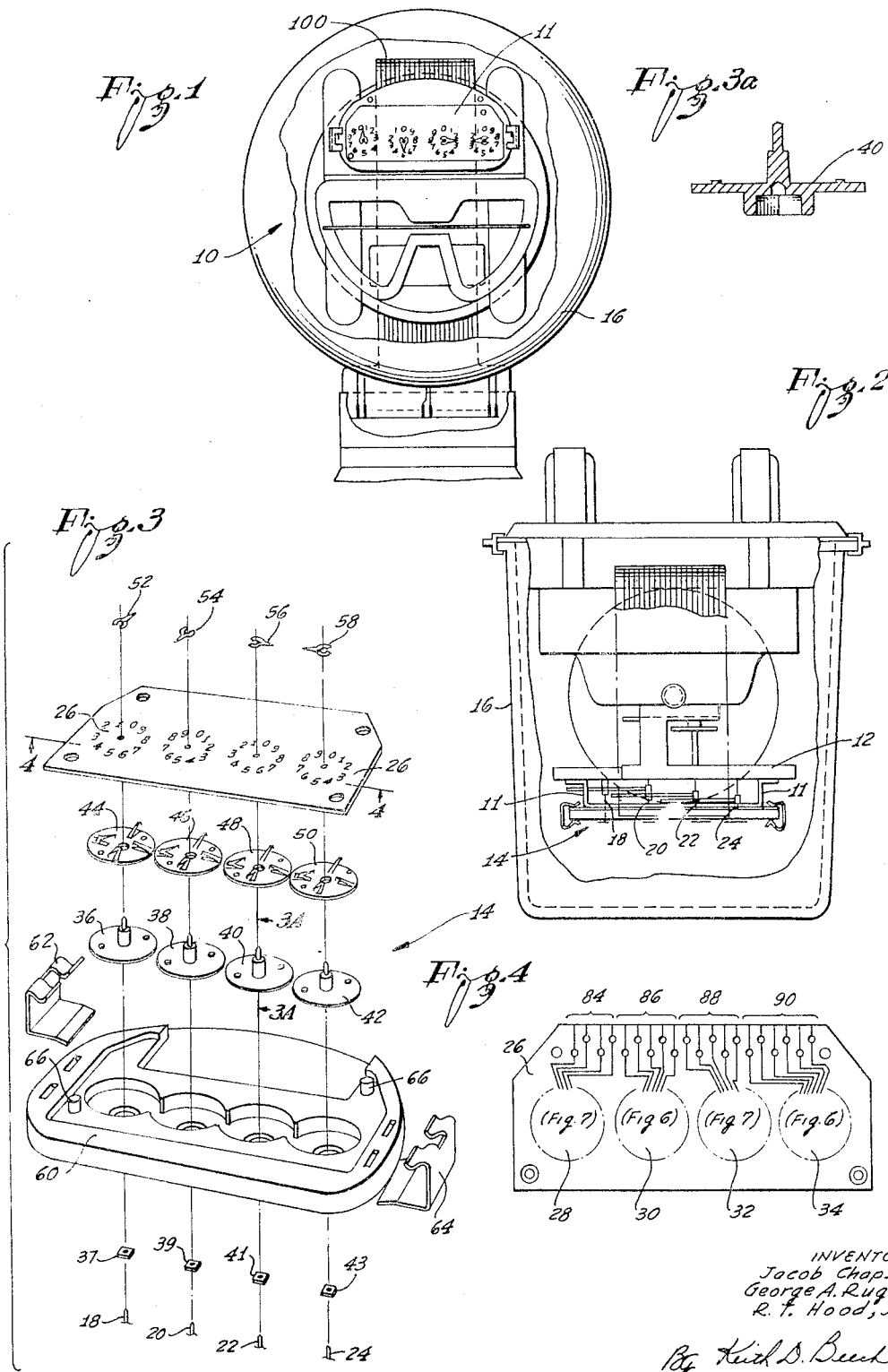

INVENTOR
Jacob Chapsky
George A. Ruger
R. T. Hood, Jr.

By Keith D. Beecher
Attorney

Jan. 17, 1967  J. CHAPSKY ETAL  3,299,423
DIGITAL ENCODER
Filed March 9, 1964  4 Sheets-Sheet 3

INVENTORS
Jacob Chapsky
George A. Ruger
R. T. Hood, Jr.
By Keith D. Beecher
Attorney Jan. 17, 1967   J. CHAPSKY ETAL   3,299,423
DIGITAL ENCODER
Filed March 9, 1964   4 Sheets-Sheet 4
Fig.8
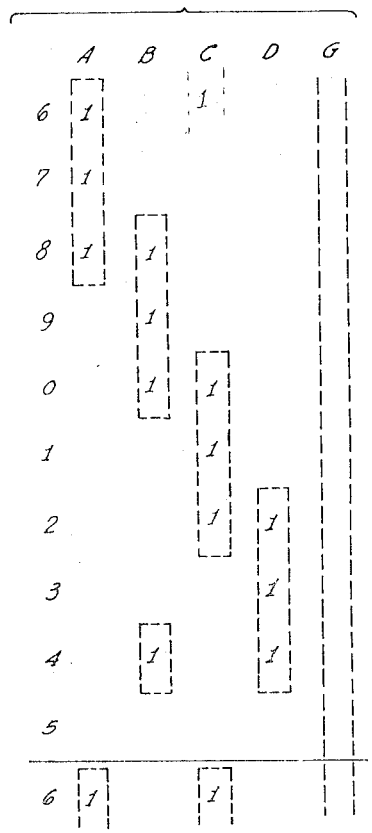
Fig.9
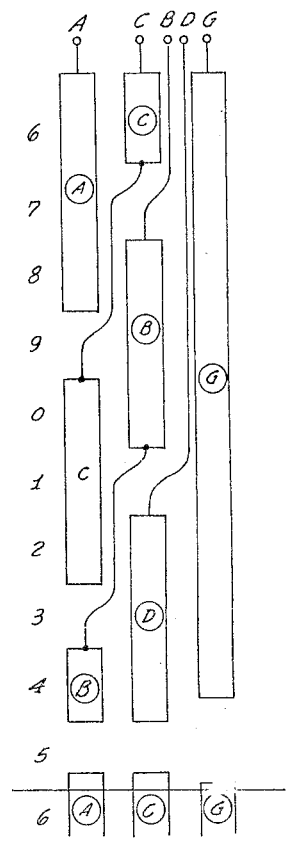
Fig.10
| | A | B | C | D |
|---|---|---|---|---|
| 1 | 1 | 0 | 0 | 1 |
| 2 | 1 | 0 | 0 | 0 |
| 3 | 1 | 1 | 0 | 0 |
| 4 | 0 | 1 | 0 | 0 |
| 5 | 0 | 1 | 1 | 0 |
| 6 | 0 | 0 | 1 | 0 |
| 7 | 0 | 0 | 1 | 1 |
| 8 | 0 | 0 | 0 | 1 |
| 9 | 0 | 1 | 0 | 1 |
| 0 | 0 | 0 | 0 | 0 |
| 1 | 1 | 0 | 0 | 1 |
Fig.11
Fig.12
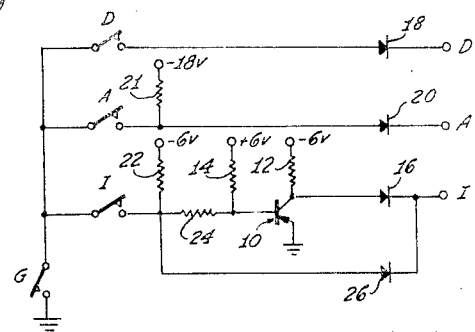
INVENTORS:
Jacob Chapsky
George A. Ruger
R. T. Hood, Jr.
By Keith D. Beecher
Attorney United States Patent Office 3,299,423
Patented Jan. 17, 1967

3,299,423
DIGITAL ENCODER
Jacob Chapsky, Los Angeles, George A. Ruger, Manhattan Beach, and R. T. Hood, Jr., Torrance, Calif., assignors, by mesne assignments, to Hersey-Sparling Meter Company, Dedham, Mass.
Filed Mar. 9, 1964, Ser. No. 350,197
5 Claims. (Cl. 340—347)

The present invention relates to digital encoders, and it relates more particularly to a mechanical rotating disc-type analog-digital converter, or encoder unit, which exhibits low torque characteristics; and which is particularly adapted for use in conjunction with utility meters, such as the usual domestic watt-hour meters, gas meters, and the like.

Digital encoders which "read" multiple decade registers used in utility meters, and other indicators and controllers, to convert the register data into electrical signals are essentially groups of shaft-position encoders, one encoder stage for each significant decade. The encoder of the present invention is intended to be mechanically coupled to the decade register included in a utility meter, or in other instrument or controller, and to convert the multistage decade readings into electrical signals representing coded digital information. The encoder of the invention, for example, is adaptable to all standard energy consumption meters.

The domestic watt-hour meter, for example, includes a multi-stage decade register and a corresponding plurality of indicator dials. These dials indicate the consumption of electrical energy by the consumer on the basis, for example, of units, tens, hundreds and thousands of kilowatt hours.

It is the present-day practice for the utility company meter man to read the different utility meters in the various localities. These readings are made periodically, and they are usually recorded in an appropriate notebook. The entries of the notebook are then transcribed at a central station into suitable form so that they may be fed into automatic billing data processing equipment.

The utility companies have been the major purchasers of electronic data processing equipment. This equipment is capable of computing and compiling utility customer service data, and of putting this information in the form of a bill to be sent to the customer. The aforementioned data processing equipment operates at extremely high speeds. For example, equipment is presently in use which is capable of servicing customer billing at the rate of 1,000 customers a minute.

However, the aforementioned data processing equipment, despite its high speed, accuracy and other capabilities, is limited in its overall efficiency by the rate at which the data is fed into the machine, and by the amount of time, effort and material required to prepare the data for assimilation by the machine, when the usual aforementioned present-day methods of data acquisition are followed.

Many attempts have been made in the prior art to develop automatic meter reading systems intended to augment or replace the usual meter man method of gathering the meter readings, and of eliminating the other operations necessary to convert the data gathered by the meter man into a form appropriate for use in the automatic billing data processing equipment at the central office of the utility company.

The prior art attempts mentioned in the preceding paragraph for the most part, however, have not been completely successful. This has been mainly due to the apparently insurmountable problem of providing such automatic reading equipment at the utility meter which will answer all the requirements of being inexpensive, easy to install in existing utility meters, and yet be extremely accurate and have no material effect upon the accuracy of the utility meter itself.

The above stated problems have been largely solved by the system disclosed in copending application Serial No. 317,548, filed Oct. 21, 1963, in the name of David R. Stuettig and assigned to the present assignee. The system disclosed and claimed in the copending application is an interpolative analog-digital converter system which is capable of converting the reading of the decade register of a utility meter into digital signals, and of achieving the conversion with a high degree of precision and with relatively inexpensive conversion equipment.

The encoder described in the copending application Ser. No. 317,548, provides discrete electrical outputs which can be transferred to the central station by a magnetic tape recorder or by digital telemetry. The encoder of the copending application provides a parallel digital function exactly equivalent to the meter register indication, and it can be interrogated at any desired time interval. The code system is constructed and conceived so that it eliminates ambiguity at the transition points.

The encoder of the present invention is particularly suited for use in conjunction with the interpolative system described in the copending Stuettig application. However, it will become evident as the description proceeds, that the digital encoder of the present invention has a wide range of applications wherever the torque requirements of the encoder must be extremely low.

It is apparent that when an analog-digital encoder is mechanically coupled to the register of such a utility meter, the torque requirements of the encoder must be negligible. This follows, since any appreciable angular drag exerted on the meter by the encoder will produce cumulative errors.

The typical analog-digital encoder includes an insulating circuit board having a conductive pattern formed on one or both of its faces, and it also includes conductive wipers or brushes. These wipers selectively engage conductive and non-conductive segments of the pattern as the brushes are rotated by the register in the meter.

In the system described in the copending application, reading ambiguities and errors in the analog-digital encoder system, normally encountered when the conductive brushes wipe past the transition points between the conductive and non-conductive segments of the aforesaid conductive pattern, are virtually eliminated. This is achieved by the inclusion of additional interpolative segments in the conductive pattern and by the inclusion of associated logic circuitry which is described in detail in the copending case. As will be described herein, the improved low torque analog-digital encoder of the present invention is readily adaptable for use in such an interpolative analog-digital encoder system.

It is usual practice to utilize a Gray code in analog-digital converters so as to reduce encoding ambiguities in the individual analog-digital encoders to one decimal integer range at any of the aforementioned transition points. This code meets the resolutional requirements at the transition points by changing only one bit for each encoded decimal integer transition. Therefore, the encoding error at any transitional point using a Gray code can be no more than one decimal integer. This concept, of course, is well understood to the art.

Ambiguities which occur between adjoining digits due to finite brush dimensions; or in the case of the multiple decade register, due to misalignment between the decade stages, are eliminated in the system to be described by the use of a "hybrid" Gray code. At the same time, in the particular embodiments of the invention to be described, the hybrid Gray code enables the number of encoder tracks to be reduced from five to three and from six to four respectively per decade, and the need for insulation between the brushes is also eliminated. This results in a reduction in the number of brushes required which reduces the torque requirements of unit constructed in accordance with the invention.

As mentioned above, a typical analog-digital converter, or encoder, of the type under consideration, includes an insulating circuit board having an encoding pattern formed thereon in a plurality of tracks or bands. The pattern includes a number of concentric bands, or tracks, as mentioned, each having a plurality of conductive and non-conductive segments. Each band is engaged by one wiper brush, and these wiper brushes move from the conductive to the non-conductive segments of each band as they are rotated.

The number of bands on the encoder disc, and the disposition of the conductive and non-conductive segments in each band, is usually dictated by the number of decimal integers to be encoded for each revolution of the disc. When the encoders are used in conjunction with a typical decade register, for example, each encoder is required to encode a range of decimal integers of from 0–9. This would normally require four concentric bands of conductive and non-conductive segments, in addition to a usual "ground" or "common" band having a continuous conductive segment for the common connection to the wiper brushes. In the system of the copending application, an additional concentric band is provided for the interpolative segment. This means that six bands are normally required in an interpolative 0–9 decimal encoder.

The encoder of the present invention is constructed so that the number of bands can be reduced and yet achieve the encoding capabilities described above. In this manner, and as noted above, a particular encoding capability can be achieved with a minimum of wiper brushes so that the resultant torque requirements of the encoder are minimized.

A primary object of the invention is to provide an improved low torque digital encoder, which exhibits high resolution and is reliably accurate and precise in its operation.

Another object of the invention is to provide such an improved encoder which is inexpensive and simple in its construction, and one which is simple and easy to install and compatible with a wide range of domestic service meters.

Another object of the invention is to provide such an improved encoder which is constructed to be small in size and to have a minimum height, so that it may conveniently be mounted in a utility meter, or the like.

A feature of the present invention is the provision of an improved analog-digital converter which is constructed to have a reduced number of bands for a certain encoding capability so as to reduce the torque requirements of the converter to a minimum.

Another feature of the invention is the provision of such an improved analog-digital converter in which all connections to the conductive segment of the different concentric bands on the encoder may be made from one side of the encoder disc, so as to simplify the construction of the encoder and to obviate the need for connections through the disc or insulated connections to the different segments.

Other objects of the invention will become apparent from a consideration of the accompanying drawings, in which:

FIGURE 1 is a front elevational view of a typical domestic watt-hour meter, on which an analog-digital converter is mounted, which converter may incorporate the concepts of the present invention;

FIGURE 2 is a top view of the meter of FIGURE 1, and illustrates more clearly the manner in which the analog-digital converter of FIGURE 1 may be mounted in the meter and mechanically coupled to the decade register therein;

FIGURE 3 is an exploded view of an analog-digital converter suitable for embodying the concepts of the invention;

FIGURE 3A is a section on the line 3A—3A of FIGURE 3;

FIGURE 4 is a bottom view of one of the components of the assembly of FIGURE 3, taken substantially on the line 4—4;

FIGURES 8 and 9 are developed schematic views, useful in explaining the concepts of the invention;

FIGURE 10 is a table designating a code used in a converter constructed in accordance with the concepts of the invention;

FIGURE 11 is a schematic developed view useful in describing the encoder incorporating the code of FIGURE 10; and FIGURE 12 is a diagram of circuitry which may be used in conjunction with the encoder of FIGURE 11 to synthesize interpolative signals.

Figure 5:
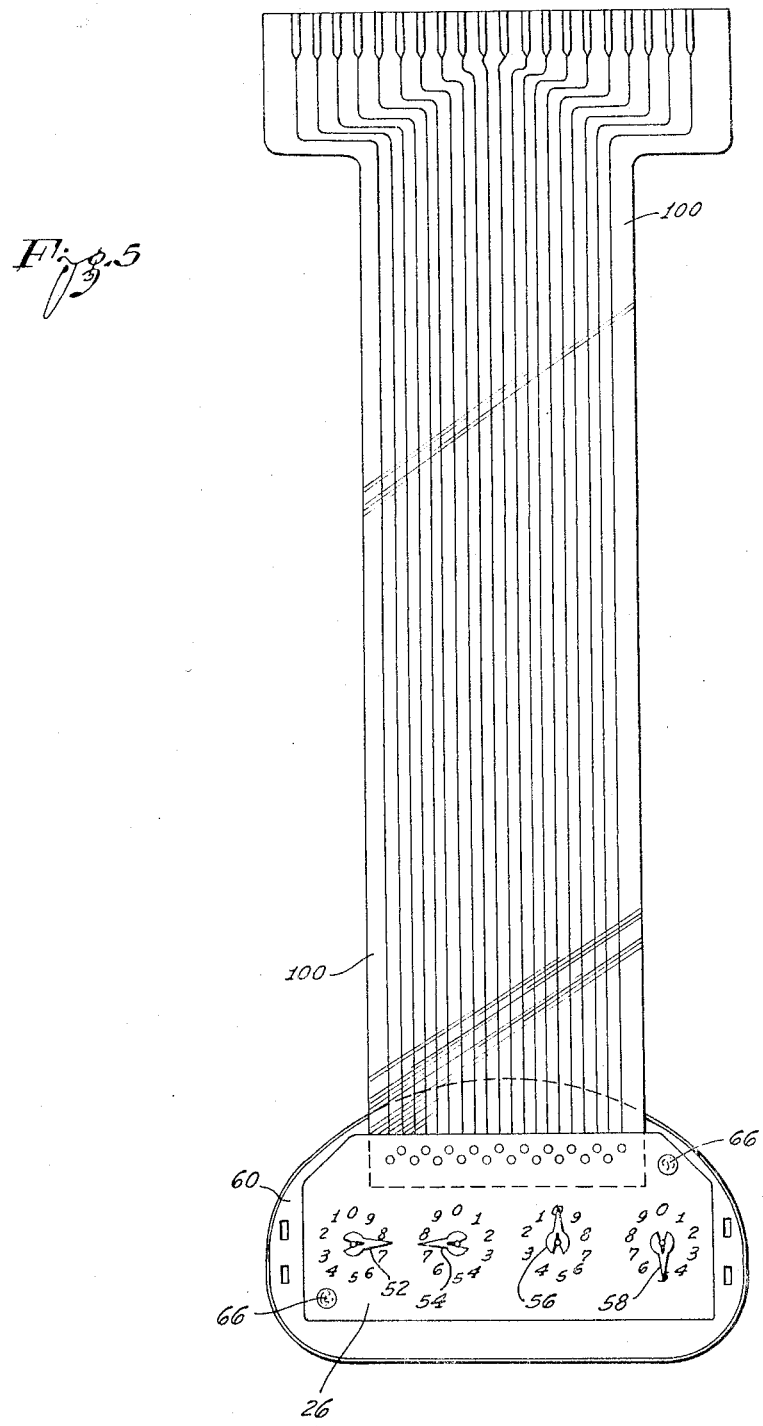
FIGURE 5 is a top view of the assembly with a flexible cable component thereof extended.

The unit and assembly to be described herein includes a flat, flexible ribbon cable which serves to bring out the electrical connections. This cable can conveniently pass through the edge of the meter, for example, without disrupting the seal between the housing and the base. The aforementioned cable is terminated in a receptacle. This receptacle, for example, may be of the type described in copending application Ser. No. 254,620, filed in the name of R. T. Hood, Jr., on Jan. 29, 1963, and assigned to the present assignee.

The aforesaid receptacle may be connected to a scanner for telephone line transmission of the data to the central station, or it may receive the plug of the meter man's magnetic tape unit, as described, for example, in copending application Ser. No. 254,126, filed Jan. 28, 1963.

As previously noted, the improved analog-digital converter, or encoder unit of the invention, is intended in one of its aspects for use in conjunction with a domestic utility meter, such as a usual watt-hour meter 10, as shown in FIGURE 1. The watt-hour meter 10 includes a conventional multi-stage decade register 11, and it normally has separate indicator dials associated with each stage of the register. These indicator dials indicate, for example, the total power consumption by the customer in "ones," "tens," "hundreds" and "thousands" of kilowatt hours.

As shown in FIGURE 2, the multiple decade register 11 in the meter 10 is mounted on a bracket 12. The improved encoder unit 14 of the invention is adapted to be conveniently mounted in the meter 10, and to be supported on the face of the analog-digital converter, as will be described.

The watt-hour meter 10 has a usual glass casing or housing 16. The encoder unit of the invention can be simply and easily installed in the meter, simply by removing the glass housing 16 and the usual dial pointers of the decade register in the meter, and then by placing appropriate inserts on the shafts of the decade register. The encoder unit is then mounted over the face of the register, and over the shafts of the register, as will be explained. These shafts are designated as 18, 20, 22 and 24 in FIGURE 3.

The encoder unit of the invention includes a circuit board 26 (FIGURE 3). The circuit board includes a plurality of code patterns 28, 30, 32 and 34, respectively corresponding to the various stages of the decade register 11. Each of the above-mentioned code patterns, as will be described in more detail subsequently, include electrically conductive printed circuit segments arranged in a plurality of concentric tracks or bands. The code patterns 28, 30, 32 and 34 are positioned on the lower surface of the circuit board 26 (FIGURE 4) to be in respective axial alignment with corresponding ones of the decade register shafts 18, 20, 22 and 24 when the encoder unit 14 of the invention is mounted in place in the meter.

A plurality of drive shaft members 36, 38, 40 and 42 are provided for respective ones of the code patterns. Each of the drive shafts includes an upper portion which extends through an aperture in the circuit board 26 at the center of its corresponding code pattern. The lower end of each of the drive shaft members has a rectangular bore (FIGURE 3A) so that it may receive a corresponding fitting 37, 39, 41 and 43. The fittings are each in the form of an insert composed, for example, of plastic, or other suitable material. Each fitting is received by the corresponding decade register shaft 18, 20, 22 or 24 in a press-fit, or other fixed relationship.

A disc-shaped hub portion is formed on each of the shaft members 36, 38, 40 and 42; and these hub portions support respective spring wiper members 44, 46, 48 and 50 against the under side of the circuit board 26. As best seen in FIGURE 3, each of the shaft members 36, 38, 40 and 42 has a pair of upstanding pins (although one is sufficient) which extend through mating holes in the corresponding wipers 44, 46, 48 and 50 to enable the shaft members rotatably to drive the corresponding wipers. The wipers have upwardly bent resilient tabs, as shown, which engage the conductive segments of the code patterns 28, 30, 32 and 34 on the underside of the circuit board 26.

The upper ends of the shaft members 44, 46, 48 and 50 receive respective pointers 52, 54, 56 and 58. The upper surface of the circuit board has numbers inscribed on it, corresponding to the original dial scales of the register face (FIGURE 3), and the pointers 52, 54, 56 and 58 are rotated with respect to such scales. This serves to permit a visual indication of the reading of the meter 10 when the encoder unit of the invention is installed therein.

A spacer housing 60, composed of plastic, or other suitable material, is provided. This housing may conveniently be clamped over the top of the register 11 in the meter 10 by means of a pair of resilient clamps 62 and 64. The housing has upper depressions, and apertures are formed at the bottom of the depressions. The shafts 36, 38, 40 and 42 extend through the respective apertures into the depressions.

It will be appreciated, therefore, that the encoder unit 14 is supported on the face of the decade register 11 in the meter 10 with its code patterns 28, 30, 32 and 34 in respective axial alignment with the decade register shafts 18, 20, 22 and 24. It will also be appreciated that no additional mounting brackets, fasteners, or the like are required in the installation of the unit.

The wipers 44, 46, 48 and 50 of the individual encoders in the encoder unit 14 are driven independently of one another by the register shafts 18, 20, 22 and 24, and by virtue of the coupling of the shaft members 36, 38, 40 and 42 with the inserts 37, 39, 41 and 43 mounted on corresponding decade register shafts.

Suitable inscriptions are provided on the upper face of the circuit board 26, as mentioned above, to index the indicator dials 52, 54, 56 and 58 for the visual reading of the meter 10 when the encoder unit of the invention is installed therein.

The contact components of the encoder units are preferably plated, for example, with gold, to prevent contact deterioration and to prolong the life of the unit. As noted, a feature of the encoder assembly is its ease of installation.

For example, to install the assembly described above in an existing power meter, it is merely necessary to remove the top glass and the original pointers from the decade register. The inserts 37, 39, 41 and 43 are then pressed onto the shafts 18, 20, 22 and 24 of the register, and the spacer housing 60 is clamped over the register by the clamps 62 and 64.

The various components of the encoder assembly are previously mounted in the spacer housing 60. That is, the shaft members 36, 38, 40 and 42 are previously placed in the depressions of the housing 60, with their lower ends in position to receive respective ones of the inserts 37, 39, 41 and 43. The wipers 44, 46, 48 and 50 are previously mounted on the respective shaft members, and the circuit board 26 is mounted in place on the housing.

The spacer 60 has a pair of integral up-standing posts 66, and these extend through apertures in the circuit board 26. When that circuit board is in place, heat is applied to these posts so that they may serve as plastic "rivets" to hold the assembly rigidly together. As mentioned, all these components are mounted in the housing 60 at the factory, so that the assembled encoder unit may be quickly mounted on the register of the meter.

After the encoder unit has been mounted on the register, the pointers 52, 54, 56 and 58 are press-fit over the top surface of the circuit board on the upper ends of the shaft members 36, 38, 40 and 42.

As the register shafts 18, 20, 22 and 24 rotate, they cause the corresponding wiper brushes 44, 46, 48 and 50 to engage selectively the code patterns 28, 30, 32 and 34 on the under side of the circuit board.

An interpolative means is built into the encoder units, as will be described, so that intra-decade decisions may be logically made in subsequent data processing equipment to eliminate encoding ambiguities, as described in the aforementioned copending application Serial No. 317,548. The resolution of the encoder unit 14 is at all times equivalent to the resolution of the meter to which it is connected. For example, in the case of a meter having a usual four-dial decade register, the resolution of the encoder unit is of the order of one part in ten thousand.

As shown in FIGURE 4, each of the code patterns 28, 30, 32 and 34 has a corresponding group of terminals. These terminal groups are designated 84, 86, 88 and 90 in FIGURE 4. Printed circuit connections connect the terminals in the different groups to corresponding segments in the different code patterns.

A flat flexible cable 100 (FIGURE 5) connects these terminals to an external outlet, and it is also previously assembled into the encoder unit. The cable 100 may be of any appropriate commercially available type. It is formed, for example, of a flexible plastic material, and it encases flexible electric conductors. The conductors extend the length of the cable 100 adjacent one another, as shown in FIGURE 5. The conductors, at one end of the cable, are welded, soldered, or otherwise connected at the factory, to the terminals of each of the groups 84, 86, 88 and 90.

The thickness of the cable 100 may be of the order of .01 inch, for example, and the cable readily passes through the sealing ring between the glass housing 16 and the base of the meter 10 (FIGURE 1) without disrupting the seal between these components, or damaging the cable in any way. A sheath may be provided for the portion of the cable outside the meter to protect the cable from tampering.

The representation of FIGURE 1 shows the encoder unit of the invention mounted in a typical watt-hour meter. The representation of FIGURE 1 also shows the flat flexible cable 100 extending from the encoder unit in the meter and passing through the sealing gasket between the meter housing 16 and its base. The external end of the cable 100 may be connected to a suitable connector. As noted above, this connector may be plugged into a receptacle, such as the receptacle described in copending application Ser. No. 254,620.

A constructed embodiment of the encoder unit 14 described above requires a torque of the order of 0.05 inchounce to drive the individual wipers. This presents less than 1% maximum loading on the individual register shafts of the meter having a four decade register. This small load is well within the calibration range of existing utility meters and can be fully compensated.

Figure 6:
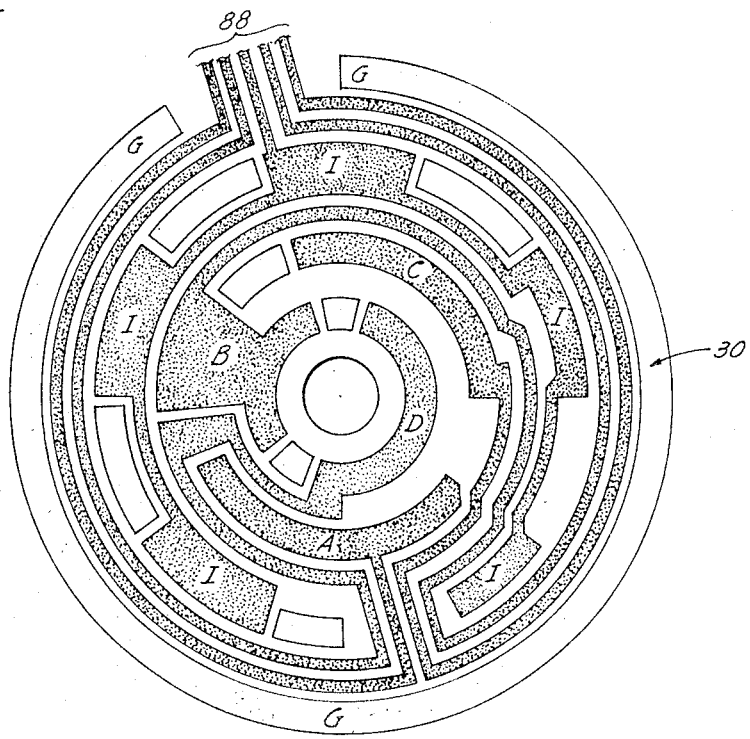
FIGURES 6 and 7 are plan views of encoder discs constructed in accordance with the concept of the present invention.
Figure 7:
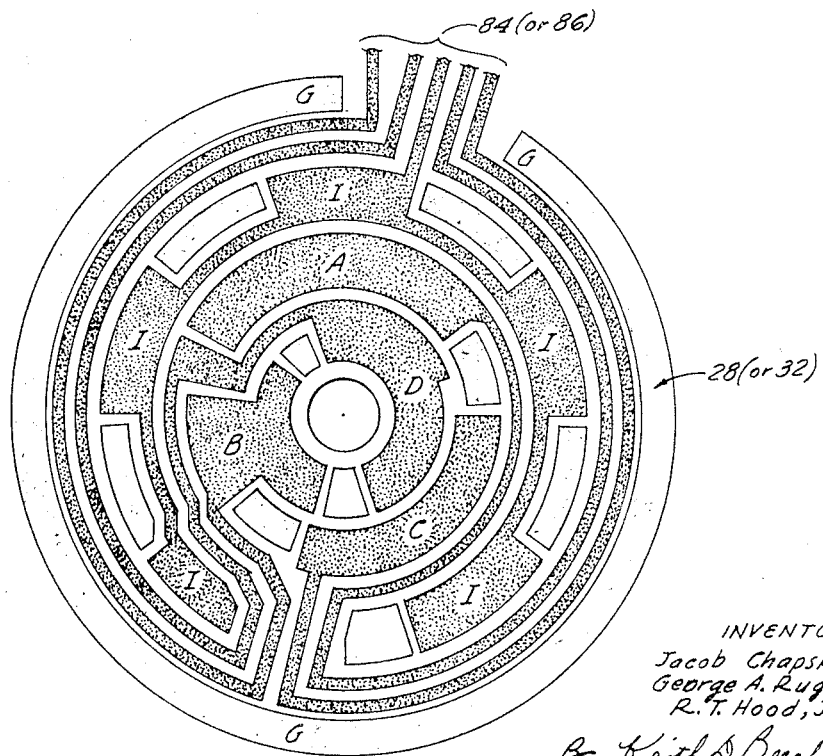

The printed circuit encoder patterns 28, 30, 32 and 34 on the lower surface of the circuit board 26 (FIGURE 4) are shown in detail in FIGURES 6 and 7. FIGURE 6 is intended to represent the "hundreds" encoder pattern 30 of the four-decade assembly. The "units" encoder pattern 34 may be the same as the pattern of FIGURE 6 except that no interpolative segments are used. The pattern shown in FIGURE 7 may be used for the "tens" or "thousands" encoder patterns 28 or 32. The various conductive segments of each of the encoder patterns are connected to terminals in the aforementioned groups 84, 86, 88 and 90. The encoder patterns of FIGURES 6 and 7 are different because in most decade registers of the type under consideration, the units and hundreds encoder shafts rotate in one direction and the tens and thousands shafts rotate in the opposite direction.

The various segments A, B, C, D, G in the code patterns of FIGURES 6 and 7 are arranged in a manner to be described in conjunction with FIGURES 10 and 11. Each of the encoder patterns of FIGURES 6 and 7, also includes a track of five distinct segments (I), and these segments constitute the interpolative band of the respective code patterns. Plated lands are shown between the segments to reduce brush wear. However, these may be omitted. No such interpolative band is provided for the code pattern which corresponds to the "units" digits, as mentioned above. The interpolative segments represent, in each instance, whether the decimal digit being encoded at any particular time is in an upper portion or lower portion of its range. This information is utilized, in a manner fully described in the copending application Ser. No. 317,548 to make the necessary logical decisions, so as to obviate ambiguity errors.

Gross errors within the individual decade are eliminated in the encoder of the present invention by adopting a hybrid Gray binary code. Such a code, as mentioned above, changes by one bit only between equivalent whole decimal numbers. However, when the Gray code is used in the interpolative system of the copending application, and as explained therein, it must be cyclic. That is, the least significant bits, for example, must change in a regular pattern for each successive advance of the code.

If the various conductive segments of the individual code patterns 28, 30, 32, 34 are to be compressed into a fewer number of bands than normally required, as is one of the objectives of the system of this invention, there is a requirement of one digital unit separation between a particular conductive segment in a first band, and a conductive segment in a second band which, in accordance with the concepts of the invention, is to be transferred into the first band. This spacing is necessary, of course, so that the two segments will not contact one another when the latter segment is shifted into the first band.

In a first embodiment to be described, the encoder is constructed so that each code pattern 28, 30, 32 and 34 combines five segment bands into three, these bands including four "number" bands and a "common," or "ground," band. In a second embodiment, the encoder is constructed so that each of the code patterns combines six normal segment bands into four bands. These latter bands include four "number" bands, a "common" or "ground" band, and an interpolative bit band.

In order to remove reading ambiguities, and in accordance with the teaching of the invention, the normally continuous conductive segment in the ground, or common, band is interrupted, in a manner to be described, so that the change from "1" to "0" is controlled by the break in the segment of the ground band, rather than by the segments in the number bands.

The developed view of FIGURE 8 is a schematic representation of the manner in which the conductive segments may be formed on an encoder circuit board in accordance with a selected hybrid Gray code. The code pattern in question includes five bands. These include four number bands designated A, B, C and D, and a ground band which includes a common conductive segment. It will be understood that although the segments in the different bands are shown as extending parallel to one another, it is usual for these segments to be formed in concentric annular bands such as shown in FIGURES 6 and 7.

A goal of the system of the present invention is to compress the four number bands of FIGURE 8, for example, into two number bands. However, under normal circumstances, if four bands are to be compressed into two, it is only possible to construct a four-level cyclic Gray type code pattern capable of eight unique combinations. This is because there can never be more than two "1's" for any given decimal integer (for if there were more than two "1's" the code could not be compressed into two bands).

In addition, since the Gray type code required must be cyclic, for the reasons stated above, it must alternate between two "1's" and one "1" for successive decimal integers, or between a "1" and no "1's."

A four-level binary code pattern provides a total of sixteen possible combinations, five of which are excluded because they contain more than two "1's." The distribution of the remaining combinations is six double "1's," four single "1's" and one no "1's." This distribution does not permit more than eight unique combinations. However, for decade purposes, ten combinations are required. The additional two combinations are obtained, as will be described, by making the ground band discontinuous.

The code pattern of FIGURE 9 includes a first band, designated A. This band includes a first segment extending across the decimal integers 6, 7 and 8. In like manner, the code pattern includes a second band B which includes two conductive segments, a first extending across the decimal integers 8, 9 and 0, and a second extending across the range of the decimal integer 4.

The code pattern of FIGURE 9 also includes a third band C which includes a conductive segment extending across the range of the decimal integer 6, and a second conductive segment extending across the range of the 0, 1 and 2 decimal integers. The code pattern also includes a fourth band D, which includes a conductive segment extending across the range of the 2, 3 and 4 decimal integers. In addition, the pattern includes a common or ground band having a single discontinuous conductive segment.

In the typical system of FIGURE 9, a plurality of brushes are provided, and these are electrically interconnected with one another. One brush, or wiper, is provided for each channel, and these wipers make selective contact with the conductive segments in the individual channels. Whenever a wiper brush engages a conductive segment, it establishes the potential of that segment at the potential of the segment in the ground channel.

Therefore, as the disc rotates, an indication of a conductive segment in the A and C channels, represent the decimal integer 6. Likewise, the indication of a conductive segment in only the A channel represents the decimal integer 7, and so on.

It will be appreciated that the conductive segments in the unit of FIGURE 9 are arranged so that there is but one bit change for each transition from one decimal digit to the next. This is in accordance with the usual Gray code practice, so as to reduce ambiguities to a single decimal integer.

An examination of FIGURE 9 will reveal that by making the conductive segment in the ground band discontinuous at the 5 level, all the conductive segments in the number channels can be compressed into two bands. Therefore, by the unit of FIGURE 9, all the indications of FIGURE 8 can be provided with but three wiper brushes, rather than five.

FIGURE 10 is a table illustrating yet another code which is capable of being used in accordance with the concepts of the present invention, and which is particularly suited for use in conjunction with the interpolative bits. As shown in FIGURE 11, for example, the conductive segments for providing the bit indications of the code of FIGURE 10 can be compressed into three bands, with an additional band being provided for the interpolative bits. The unit of FIGURE 11, however, cannot provide the I (interpolative) band information during the time that the common (G) band is open. The required synthetic I bit information is generated by means of the circuit of FIGURE 12.

FIGURE 11, therefore, shows a pattern of conducting and non-conducting segments in four bands. A unique feature of the encoder, as mentioned, is that the common, or ground segment is interrupted at one point corresponding to the decimal number 0. It is at this point in the encoding cycle that an otherwise random transition of two digits is converted into a controlled non-ambiguous change.

That is, in the two transitions between the decimal numbers 9 and 0 and between the decimal numbers 0 and 1, the code is controlled by the segment in the ground band. This control by the ground segment is a single channel change and, therefore, a non-ambiguous one.

During the transition from 9 to 0, for example, the brush contact with the segment in the ground channel is broken before the corresponding brush leaves the B segment. During the transition from 0 to 1, on the other hand, the brush contact with the ground segment is restored after the corresponding brush makes contact with the A segment. In this manner, reading ambiguities in the 9–0 and 0–1 transitions are avoided, and the transitions themselves are controlled by the discontinuous segment in the ground channel.

The I band, or channel, as mentioned above, provides the interpolation information. The I segments contain extra data which, as explained, can be interpreted by simple logic to correct for either an advanced or retarded carry between decade stages due to encoder mounting deficiencies and brush tolerances.

The circuit of FIGURE 12, as mentioned above, provides the interpolation information during the time the common (G) band is open. The same result can be achieved by selectively offsetting the I, A and G segments with respect to one another at the discontinuous portion of the G band.

The circuit of FIGURE 12 includes a transistor 10. The transistor 10 is of the PNP type, and it may be of the type commonly designated 2N1305. The emitter of the transistor 10 is grounded, and the collector is connected to the negative terminal of a six volt source, for example, through a 2.2 kilo-ohm resistor 12. The base of the transistor 10 is connected to the positive terminal of the source through a 30 kilo-ohm resistor 14. The collector of the transistor is also connected through a diode 16 to an output terminal designated I. The outputs from the D, A and I segments of the analog-digital encoder unit of FIGURE 4 are indicated by the switches D, A and I. Also, the switch G represents the output from the discontinuous segment (G) of the common, or ground, channel. Whenever the corresponding wiper brush engages the conductive segment in the common channel, the switch G is assumed to be closed. Likewise, when the switch G is closed, and any of the wiper brushes contact the conductive D, A or I segments, the respective switches D, A and I are assumed to close.

The D switch is connected through a diode 18 to the output terminal "D," and the A switch is connected through a diode 20 to the output terminal "A." The diodes 16, 18 and 20 may be of the type designated 1N456A. The terminal "A" is also connected to the negative terminal of an 18-volt direct voltage source through a resistor 21 whereas the switch "I" is connected to a negative terminal of a six-volt source through a resistor 22. The resistors 20 and 22 may each have a value of three kilo-ohms. The switch "I" is also connected through a 40 kilo-ohm resistor 24 to the base of the transistor 10, and through a diode 26 to the interpolative output terminal "I." The latter diode may also be of the type presently designated 1N456A.

From the circuit of FIGURE 12, it will be appreciated that whenever the corresponding brushes engage the conductive G segment and the conductive D segment, the switches D and G are effectively closed, so as to provide an output at the output terminal "D." Likewise, whenever the wiper brushes engage the G conductive segment and the A conductive segment, the A and G switches are effectively closed, so as to provide an output at the output terminal "A." Similarly, whenever the wiper brushes engage the G conductive segment and an I conductive segment, the I and G switches are effectively closed, so as to provide an output through the diode 26 to the I output terminal.

However, a problem arises in that is is desired to provide an interpolative output during the interval in which the corresponding wiper brush engages the discontinuous portion of the common channel, so as to break the common connection.

It will be appreciated that when the wiper brush engages the lowermost I conductive segment in the schematic representation of FIGURE 11, without further provision, no indication would be provided, because it is at that time the common G connection is broken.

However, it will be observed from the representation of FIGURE 11, that a continuous D segment exists across the discontinuous portion of the G conductive segment, and that the lowermost A segment is arranged to be engaged by a wiper brush at the same time an inter-connected wiper brush engaged the lowermost I segment.

Therefore, the latter condition creates a condition in the circuit of FIGURE 12 during which the switch G is opened, and initially, the switch D is closed. Then, the switches A and I also close. Under these conditions, and even though the G switch is open, a desired indication is provided at the interpolative output I. This is by virtue of the fact that the transistor 10 is biased, due to the closure of the switch I and of the switch A, during this latter condition, so as to establish the I output terminal at ground potential and thereby to synthesize the desired output.

The representations of FIGURES 6 and 7 show the manner in which the conductive pattern, shown in a developed and schematic form in FIGURE 11, may be actually mounted on the circuit board 26 of FIGURE 3. As also noted, the fact that the ground, or common, segment is broken at a specific interval during each revolution of the disc, the wiper brushes can be arranged to pass over and engage the leads from the segments to the output terminals only at times when the ground connection is broken.

Then there is no need to provide insulation for the aforesaid leads, or to cause them to extend through apertures in the circuit board to the opposite side. This simplifies to a large extent the construction of the encoder stages. Even though the passage of the brushes over the conductors can cause short circuits between the conductors, this does not affect the read out circuitry, since that circuitry is sensitive only to signal levels referenced to ground.

The invention provides, therefore, an improved digital encoder which may be constructed to provide code indications of a particular resolution with a minimum of bands and associated wiper brushes. This construction provides an encoder exhibiting extremely high reliability and low torque characteristics.

An important feature of the invention, as described, is the provision of a discontinuous segment in the common band, or channel. This not only permits a successful non-ambiguous reduction in the required number bands for a given resolution, but also permits other simplifications in the structure to be realized, as explained above.

As also described, although its use is not limited to any particular encoder system, the encoder of the invention finds particular utility in the aforesaid interpolative encoder system. In the latter case, certain interpolative information can be synthesized by simple associated circuitry, as described in conjunction with FIGURE 12. This latter circuitry, of course, could be incorporated into the recorder used to acquire data from the encoder assembly.

While a particular embodiment of the invention has been described, it is evident that modifications may be made. The following claims are intended to cover such modifications.

What is claimed is:

1. A digital encoder for converting analog quantities into signals representative of decimal digits ranging from 0-9, including: a support means, a code pattern disposed on said support means, said code pattern including electrically conductive number segments positioned in a pair of channels and including a further discontinuous electrically conductive common segment positioned in a further channel and interrupted at a point representative of a selected decimal digit, three wiper brushes electrically connected to one another and positioned to engage respectively the segments in said pair of channels and said discontinuous common segment in said further channel, so as to interconnect selectively the number segments in said pair of channels to said common segment in said further channel, and means for supporting said support means and said brushes for relative motion therebetween.

2. The digital encoder defined in claim 1 and which includes terminal means and uninsulated electrical conductors extending across said panel from said segments to said terminal means, said electrical conductors being positioned to be engaged by said brushes when the brush engaging said common channel is in engagement with the discontinuous portion of said segment therein.

3. The digtal encoder defined in claim 1 which includes a further brush electrically connected to the aforesaid brushes and in which said pattern includes a further channel having interpolative conductive segments therein to be selectively engaged by said further brush, and circuitry adapted to be coupled to said segments in said plurality of channels for synthesizing interpolative signals when the brush engaging said common channel is in engagement with said discontinuous portion of said segment therein.

4. The digital encoder of claim 1 in which selected ones of said number segments in said pair of channels are interconnected to constitute four distinct number bands.

5. The digital encoder of claim 1 in which said number segments in said pair of channels and said common segment in said further channel are positioned so that there is but one bit change for each transition of said brushes from one decimal digit to the next.

References Cited by the Examiner

UNITED STATES PATENTS 2,818,557 12/1957 Sink et al. _____ 340—347
3,006,712 10/1961 Eichacker _____ 346—14

MAYNARD R. WILBUR, *Primary Examiner.*

A. L. NEWMAN, *Assistant Examiner.*